Figure 5:
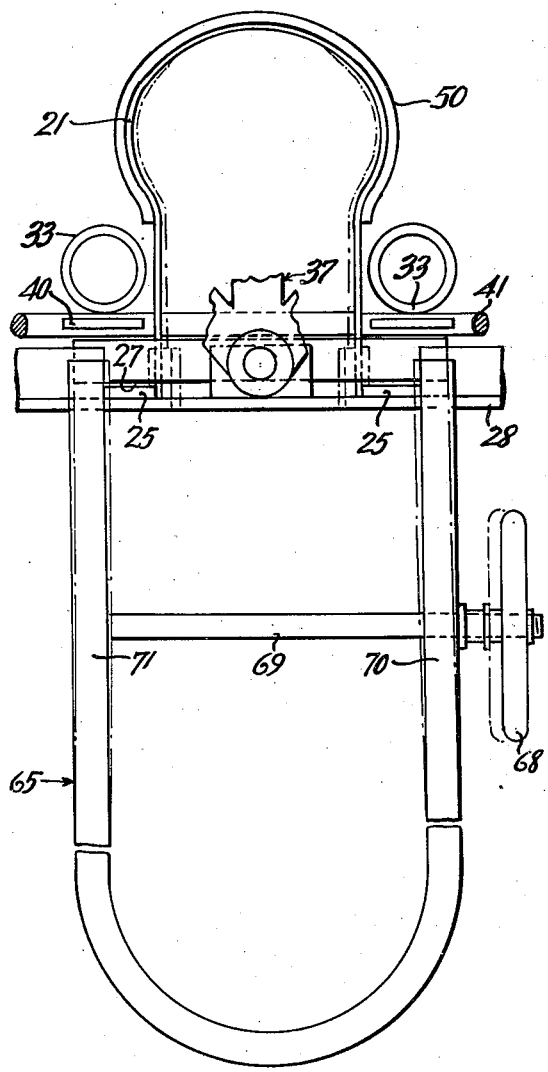

April 27, 1943.  H. J. GALEY  2,317,904
GLASS BENDING APPARATUS
Filed March 11, 1941  5 Sheets-Sheet 1
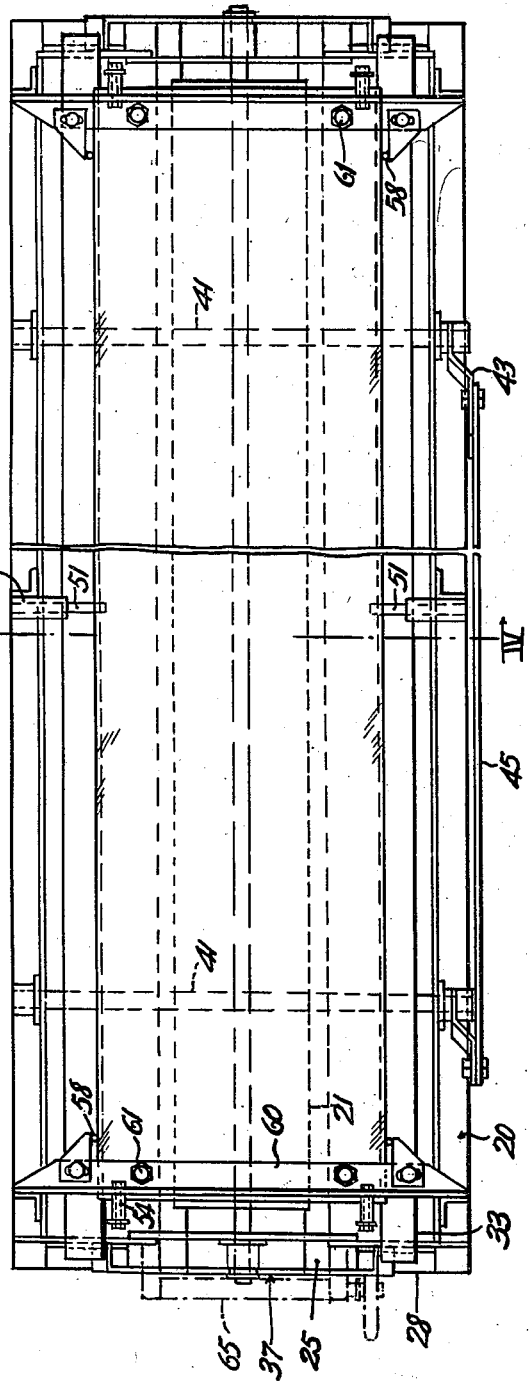
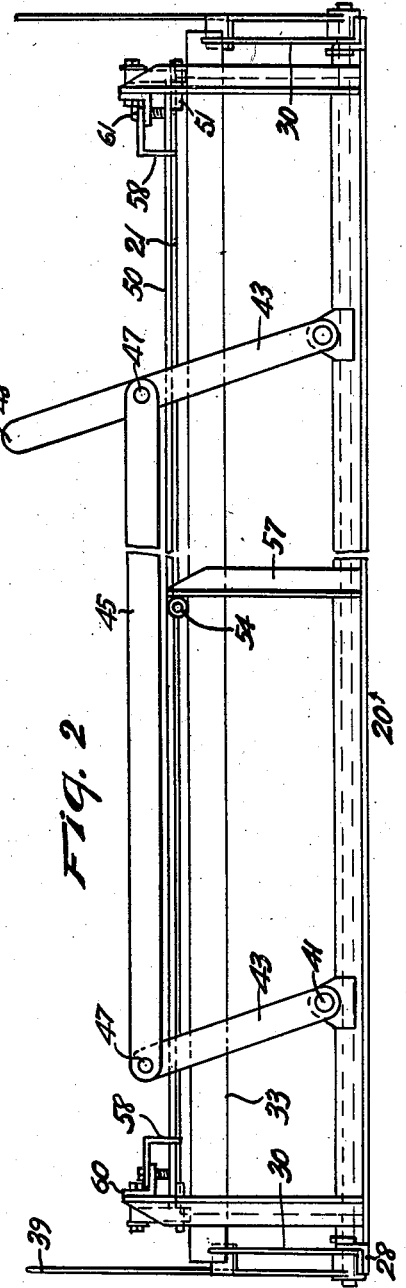
Inventor
HENRY J. GALEY
By Olen E. Bee
Attorney

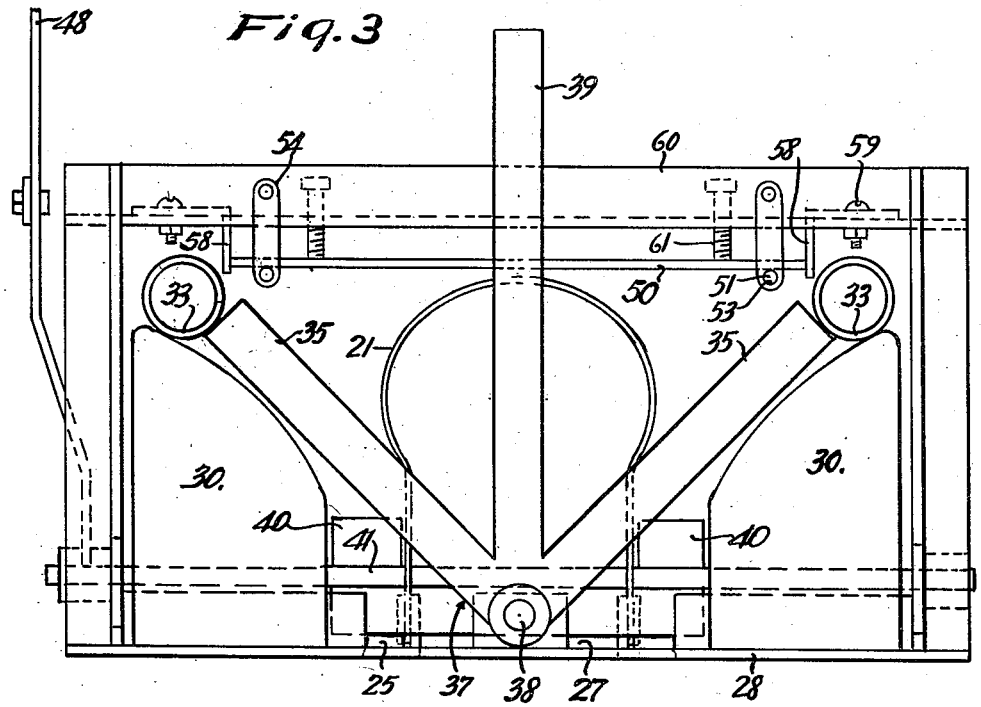
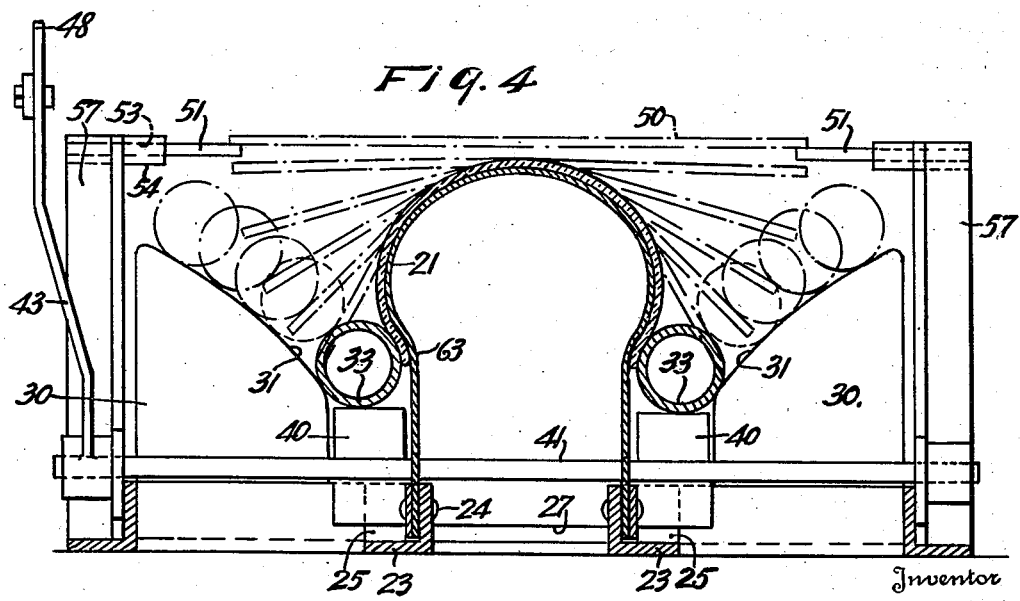

April 27, 1943.  H. J. GALEY  2,317,904
GLASS BENDING APPARATUS
Filed March 11, 1941  5 Sheets-Sheet 3

Henry J. Galey  Inventor

By  Olew E. Bee  Attorney

April 27, 1943. H. J. GALEY 2,317,904
GLASS BENDING APPARATUS
Filed March 11, 1941 5 Sheets-Sheet 4
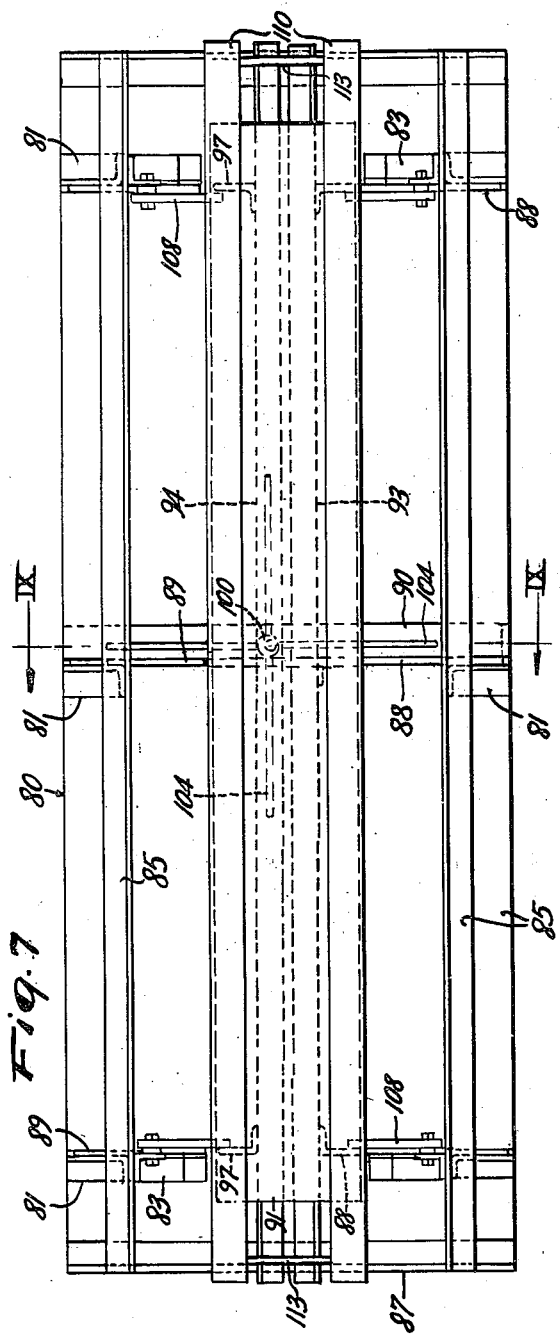
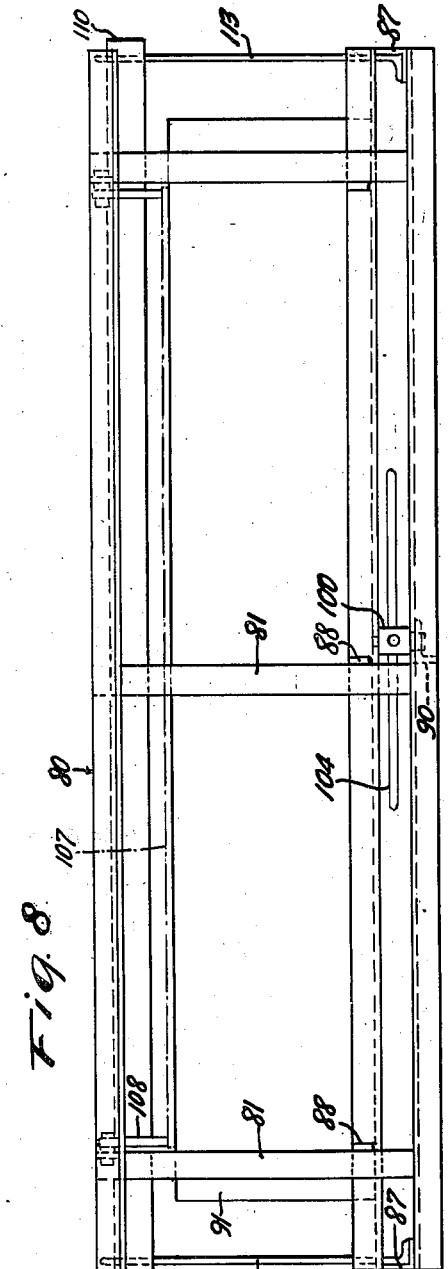
Inventor
HENRY J GALEY
By Olen E. Bee
Attorney April 27, 1943. H. J. GALEY 2,317,904
GLASS BENDING APPARATUS
Filed March 11, 1941 5 Sheets-Sheet 5

Inventor
HENRY J GALEY
By Olew E. Bee
Attorney

Patented Apr. 27, 1943

2,317,904

UNITED STATES PATENT OFFICE 2,317,904

GLASS BENDING APPARATUS

Henry J. Galey, Tarentum, Pa., assignor to Pittsburgh Plate Glass Company, Allegheny County, Pa., a corporation of Pennsylvania Application March 11, 1941, Serial No. 382,708

7 Claims. (Cl. 49—67)

This invention relates to glass bending apparatus and it has particular relation to apparatus designed to bend sheet glass into channel form.

One object of the invention is to provide an improved apparatus for bending relatively small sheets of glass.

Another object of the invention is to provide an apparatus in which improved marvering operations are available in bending sheet glass into channel form.

Another object of the invention is to provide an improved glass bending mold and cooperating bending mechanism for producing bent glass having its cross section of substantially C-shape.

In one form of the invention a mold is provided to which glass is adapted to be applied exteriorly in the bending operation. This mold is particularly designed to accommodate relatively small units of glass for use in fluorescent lighting, or the like, although applicable for other uses. The mold form is of inverted channel form and the glass is disposed along its central portion above the mold in which position it is transported into a heating zone. Suitable rolls are guided under the influence of their own weight upon the glass and along the sides of the mold as the glass softens and these rolls insure proper shaping of the glass to the mold sides. Under certain conditions it may be desirable to hold the glass spaced above the mold until the heat reaches a predetermined value in order to guard against breaking of the glass which might otherwise occur if the metal and glass initially heated in contact with each other. Supports which bend or break in response to heat at predetermined temperatures are designed for this purpose and lower the glass at the proper time into contact with the mold. Also the mold is made of such material that its sides can be drawn toward each other to contract the mold sufficiently to facilitate removal of the glass therefrom.

Figure 6:
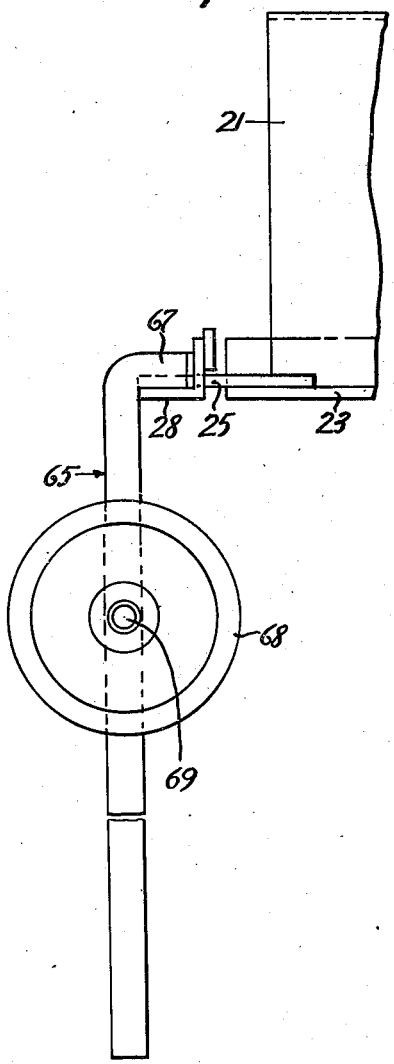
Figure 9:
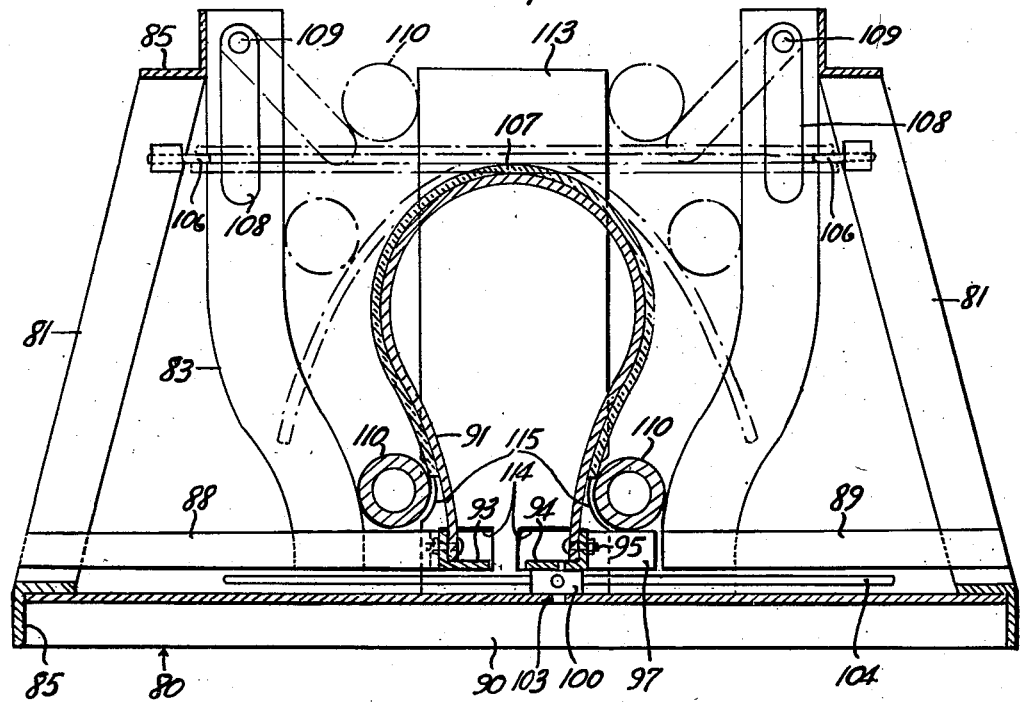
Figure 10:
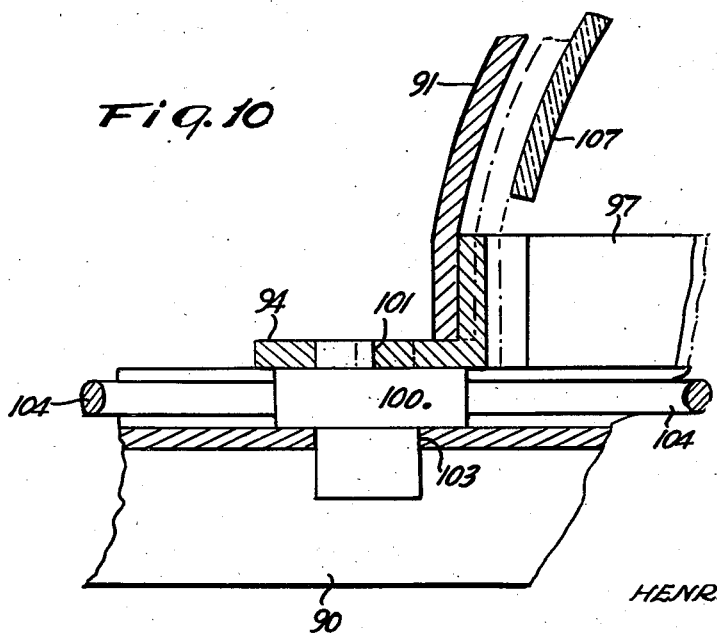

In the drawings:

Fig. 1 is a fragmentary plan of a glass bending apparatus; Fig. 2 is a side elevation of the apparatus shown in Fig. 1; Fig. 3 is an end elevation on a larger scale of the apparatus shown in Fig. 1; Fig. 4 is a cross section, on a larger scale, taken substantially along the line IV—IV of Fig. 1; Fig. 5 is a fragmentary end elevation of the glass bending apparatus including an attachment to facilitate the contracting of the mold; Fig. 6 is a side elevation of the attachment as applied in a glass bending apparatus; Fig. 7 is a plan of another form of glass bending apparatus; Fig. 8 is a side elevation of the apparatus shown in Fig. 7; Fig. 9 is a cross section on a larger scale taken substantially along the line IX—IX of Fig. 7; and Fig. 10 is a fragmentary large scale cross section illustrating the mold contracting mechanism.

Referring to Figs. 1 to 4, an elongate frame 20 is provided with a centrally located channel mold 21 of inverted U-shape which is composed of resilient sheet metal having, as far as possible, a coefficient of expansion approximately the same as that of glass. Angle irons 23 (Fig. 4) are fastened rigidly, as indicated at 24, along the lower edges of the mold and opposite end portions of these angle irons are provided with integral extensions 25 which pass through horizontal slots 27 (Figs. 4 and 5) formed in lower transverse angle members 28 at the ends of the frame. These extensions are slidable laterally in the slots.

Upright plate guides 30 rigidly mounted upon opposite end portions of the frame and on opposite sides of the mold are provided with inclined guiding edges 31 leading downwardly toward the lower extremities of the mold. Tubular marvering rolls 33 are disposed on opposite sides of the mold and in an upper position rest upon the inclined edges adjacent their upper extremities and upon end portions of arms 35 of a double bell crank 37 mounted at each end of the frame upon a horizontal rod 38. A lower portion of the frame provides bearings for rotatably supporting the rod 38 which is mounted longitudinally in the frame. Each bell crank includes an intermediate or handle arm 39 which extends upwardly above the frame and can be tripped to release the rolls so as to permit the latter to roll down the inclined edges 31 under the influence of gravity.

Before they reach their lowermost positions, the rolls 33 come to rest upon fins 40 formed rigidly upon rods 41 that are arranged transversely and rotatably in the lower portion of the frame and extend freely through the lower side portions of the mold. By rotating these rods through an angle of approximately 90 degrees, the fins are moved from an upright position (Fig. 4) to a horizontal position (Fig. 5). Upright levers 43 rigidly secured to corresponding ends of the rods 41 on one side of the frame are connected adjacent their upper ends by means of a link 45 pivotally secured thereto, as indicated at 47. A parallelogram arrangement is thus formed to operate the rods 41 in unison, and by tripping a rigid extension 48 on one of the levers, the several fins 40 can be operated concurrently to raise or lower them between vertical and horizontal positions.

A glass plate 50 is supported horizontally above the mold in slightly spaced relation thereto upon wooden pegs 51 carried horizontally in openings 53 formed in brackets 54 that are mounted upon the ends and sides of the frame 20. Upright bars 57, constituting portions of the frame, support the side brackets 54. The position of the plate of glass is gauged by centering members 58 which are adjustably bolted, as indicated at 59, to an upper cross member 60 of the frame. Set screws 61 can also be threaded through each cross member 60 to contact the upper surface of the glass for the purpose of steadying it preparatory to the heating and bending operations.

The frame 20 with the glass mounted thereon, as described, is heated by passing it through the furnace and as the entire assembly is heated, the pegs 51 burn away to release the glass which then is lowered into engagement with the upper surface of the mold 21. Heat of sufficient intensity to soften the glass is applied to the assembly and then the glass begins to bend, as indicated in the broken lines of Fig. 4. As soon as the glass bends to such extent that its edges pass the location of the marvering rolls in their upper position, the latter are released by actuating the handle 39. The rolls bear against the glass to increase the progress of bending, and also to press the lower glass edges firmly against the inwardly turned bent portion 63 in the side walls of the mold. These operations form a cross sectional contour of C-shape in the glass. The rolls rest upon the upright fins 40 while holding the glass edges against the mold and are maintained in such position until the glass cools sufficiently to insure its setting to shape. Then the extension 48 is operated to turn the fins to horizontal position (Fig. 5) and lower the rolls out of engagement with the glass.

In order to facilitate removal of the shaped glass from the mold, the U-shaped yoke 65 (Figs. 5 and 6) having angularly disposed fingers 67 is applied to each end of the frame upon the lower frame member 28. The fingers 67 of each yoke are disposed in laterally abutting relation to the outer edges of the extensions 25 upon the flange of the angle member 28. By operating a wheel 68 which is threaded upon one end of a rod 69 slidably extending through one leg 70 of the yoke and secured to the other leg 71, the fingers 67 are drawn laterally toward each other and the lower sides of the resilient mold are sprung inwardly to release the glass which can then be slid longitudinally from the mold.

In the form of the invention shown in Figs. 7 to 10, a frame 80 is provided with upright braces 81 and upright guides 83 formed into a rigid structure by means of upper and lower longitudinally disposed angle irons 85 and lower transverse angle irons 87. Additional transverse shorter bars 88 and 89 brace the guides 83 and space their lower ends vertically from a central lower transverse angle iron 90.

The inner edges of the guides 83 are curved downwardly and inwardly in spaced relation to the sides of a resilient metal mold 91 which is similar in cross sectional contour to an inverted U, although the lower sides of the mold converge inwardly and are provided with lower longitudinal angle irons 93 and 94 bolted rigidly thereto, as indicated at 95. The transverse bars 88 on one side of the mold are rigidly secured to the adjacent angle iron 93, while the bars 89 on the other side of the mold extend only from the lower portion of the guides 83 to the upright braces 81. Thus one side of the mold with the angle iron 94 is movable and the other side is rigidly connected through the angle iron 93 to the bars 88. Lateral supports 97 are rigidly connected to the angle iron 94 and are disposed at the same level as the bars 88 and 89.

An eccentric block 100 on one side is provided with a bearing 101 in the lower horizontal flange of the angle iron 94 and a second bearing 103 on the other side of the block is mounted in the upper horizontal flange of the central transverse angle iron 90. The axes of these bearings are spaced, and by operating any one of several horizontal handles 104, extending rigidly from the eccentric block, the mold can be contracted; that is, the lower mold sides are moved toward each other in response to the actuation of the eccentric block. If desirable, the mold can be coated with a composition of asbestos or other heat resistant material which will not adversely affect the glass 107 to be bent. Also wooden pegs 106 similar to the pegs 51 shown in the other form of the invention can be applied in the same manner to the frame 80.

The glass is positioned horizontally over the mold, and arms 108 which have pivotal connections 109 securing end portions thereof to the upper ends of the guides 83, rest with their free ends contacting the upper surface of the glass as shown in broken lines of Fig. 9. Marvering rolls 110 are positioned upon the arms 107 and against opposite vertical edges of upright guide plates 113 which are rigidly secured to the frame adjacent opposite ends thereof. Suitable openings 114 are formed in the lower portions of the guide plates to accommodate the ends of the angle irons 93 and 94, and to provide for lateral movement of the angle iron 94. In this position of the parts, as described, the assembled frame and glass are transported into a heated zone, such as that commonly employed in heating glass to softening temperature, and upon reaching such temperature, the glass begins to bend under its own weight and under the weight of the marvering rolls 110. The arms 108 swing downwardly and the rolls are lowered against the glass as it bends. The rolls which are guided by the aid of the edges of the guides 83, press the glass until it reaches its full line position, as shown in Fig. 9. The rolls then rest upon the bars 88 and lateral supports 97 and still contact the extreme edges of the glass. The lower portions of the guide plates 113 are cut away, as indicated at 115, to permit the rolls 110 to press the lower edges of the glass against the mold. The assembly is cooled sufficiently to insure setting of the glass and the eccentric block 100 is then operated to contract the mold, as indicated in Fig. 10, in order to facilitate sliding of the molded glass therefrom.

Although practical structure involving the invention has been shown and described in detail, it will be apparent to those skilled in the art that the invention is not so limited, but that various changes can be made therein without departing from the spirit of the invention or from the scope of the appended claims.

I claim:

1. An apparatus for use in bending sheet glass comprising a frame structure, an inverted channel mold mounted on the frame structure and adapted to support a sheet of glass along the central portion of the latter whereby the glass when heated to softening temperature assumes channel form about the mold, guiding means disposed adjacent the mold and extending toward the lower portion thereof, and rolling means movable along the guiding means into contact with the glass to assist in bending the glass against the mold surface.

2. An apparatus for use in bending sheet glass comprising a frame, an inverted channel mold mounted on the frame and adapted to support a sheet of glass along the central portion of the latter whereby the glass when heated to softening temperature assumes channel form about the mold, guiding means disposed adjacent the mold and extending toward the lower portion thereof, rolling means movable along the guiding means into contact with the glass to assist in bending the glass against the mold surface, supporting mechanism adjacent the sides of the mold for holding the rolling means at the completion of the bending and molding operation against the lower extremities of the glass thereby pressing the latter in close contact with the mold, and means for lowering the rolling means on the supporting mechanism away from the position of contact with the glass.

3. A glass bending apparatus comprising a resilient mold of inverted channel shape, means for supporting the lower edge portions of the mold in movable relation toward one another, means for supporting a glass sheet over the mold with its edges extending beyond opposite sides of the mold, guiding means disposed adjacent the mold and extending toward the lower portion thereof, means movable along the guiding means into contact with the glass to assist in bending the glass against the mold surface, and mold contracting mechanism engageable with the lower portion of the mold for actuating the mold sides toward each other and thereby facilitating removal of the glass from the mold.

4. A glass bending apparatus comprising a mold of inverted channel form adapted to be subjected to heat of sufficient intensity to soften glass, inclined guides on opposite sides of the mold and converging toward the lower portion of said mold, and rolls disposed in rolling relation against the guides for contacting the softened glass on the mold and pressing such glass against the sides of the mold.

5. A glass bending apparatus comprising a mold of inverted channel form adapted to be subjected to heat of sufficient intensity to soften glass, inclined guides on opposite sides of the mold and converging toward the lower portion of said mold, rolls disposed in rolling relation against the guides for contacting the softened glass on the mold and pressing such glass against the sides of the mold, and means temporarily holding the rolls in their upper position of support upon the guides, said means being movable to release such rolls for travel under the influence of gravity down the guides.

6. A glass bending apparatus comprising a resilient mold of inverted channel shape, means for supporting sheet glass in spaced relation above the mold and responsive to action of heat to lower the sheet glass into contact with the mold at predetermined temperature, and means to press the softened glass against opposite sides of the mold.

7. A glass bending apparatus comprising a resilient mold of inverted channel form, wooden pegs for supporting the sheet glass in spaced relation above the mold and adapted to burn off in response to action of heat for lowering glass into contact with the mold at predetermined temperature, means for supporting the pegs, and means to press the glass against the opposite sides of the mold.

HENRY J. GALEY.